Sept. 27, 1949.  F. N. EL-MAZZAOUI  2,483,040
MOTION-PICTURE FILM WITH A PLURALITY OF PICTURE
SERIES AND PROJECTOR FOR THE SAME
Filed Feb. 18, 1947  4 Sheets-Sheet 1

Inventor
Farid Naoum El-Mazzaoui

By Clarence A. O'Brien
and Harvey B. Jacobson
Attorneys

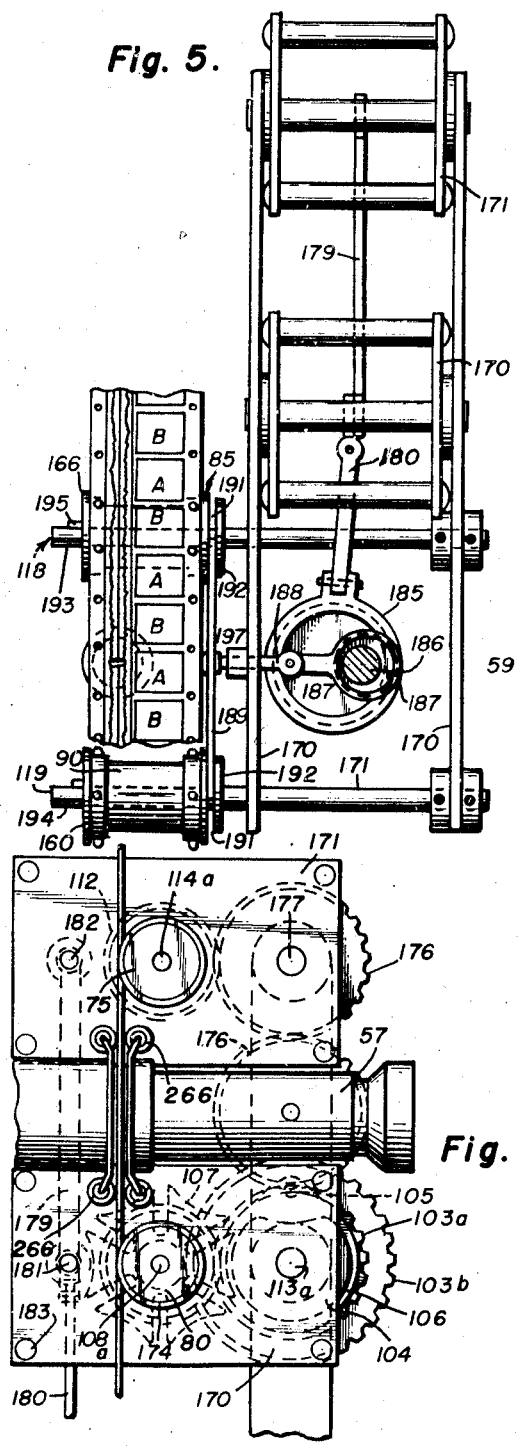
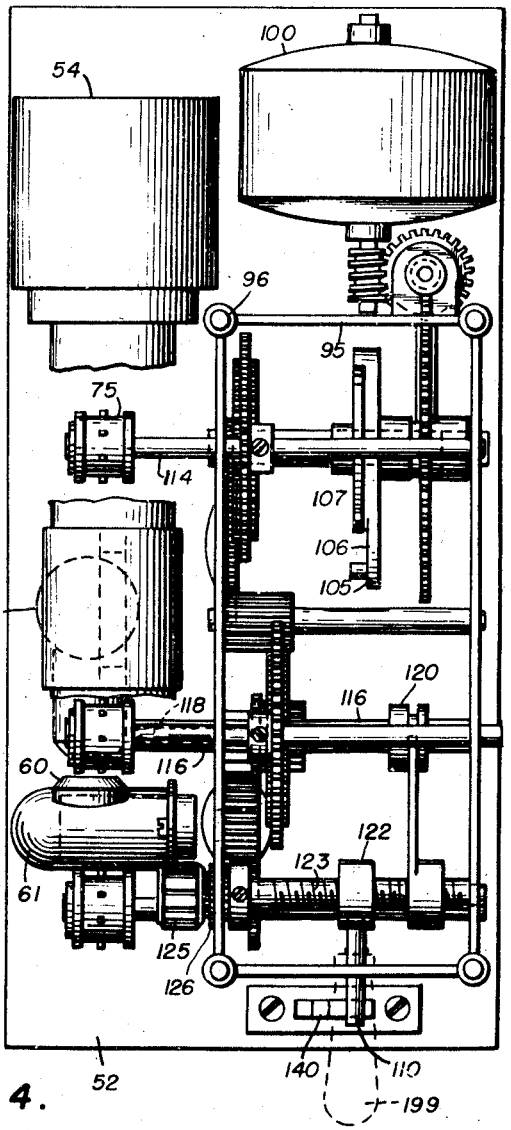

Sept. 27, 1949.   F. N. EL-MAZZAOUI   2,483,040
MOTION-PICTURE FILM WITH A PLURALITY OF PICTURE
SERIES AND PROJECTOR FOR THE SAME
Filed Feb. 18, 1947   4 Sheets-Sheet 3
Fig. 3.
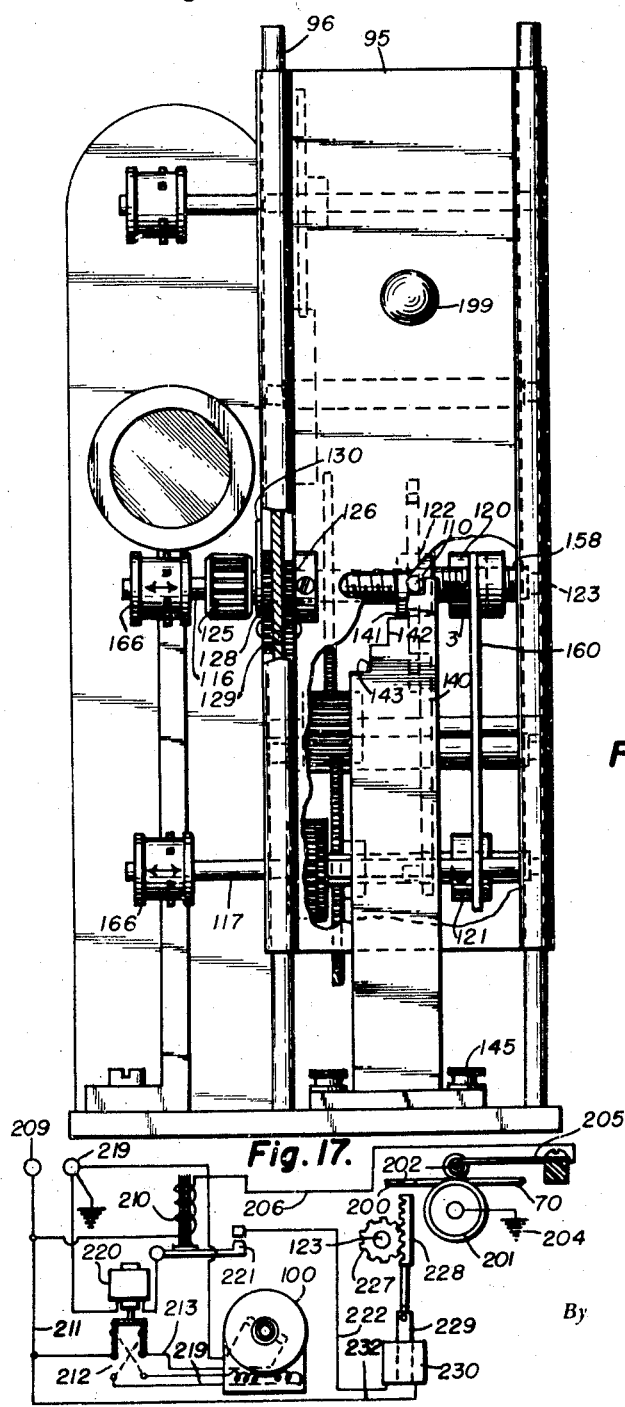
Fig. 16.
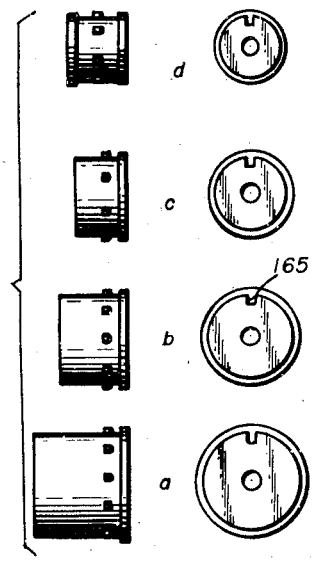
Fig. 10.
Fig. 8.
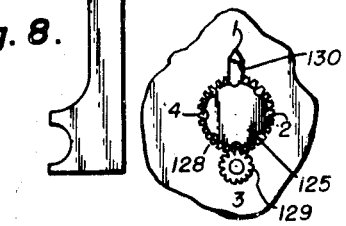
Fig. 9.
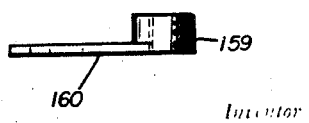
Inventor
Farid Naoum El-Mazzaoui
Fig. 17.
By Clarence A. O'Brien
and Harvey B. Jackson
Attorneys Sept. 27, 1949. F. N. EL-MAZZAOUI 2,483,040
MOTION-PICTURE FILM WITH A PLURALITY OF PICTURE
SERIES AND PROJECTOR FOR THE SAME
Filed Feb. 18, 1947 4 Sheets—Sheet 4
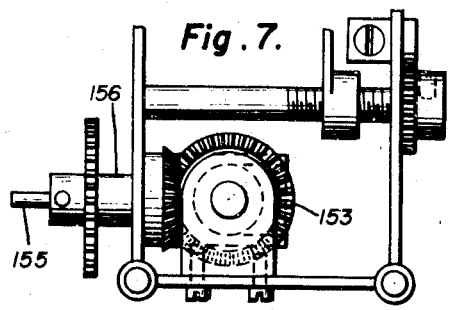
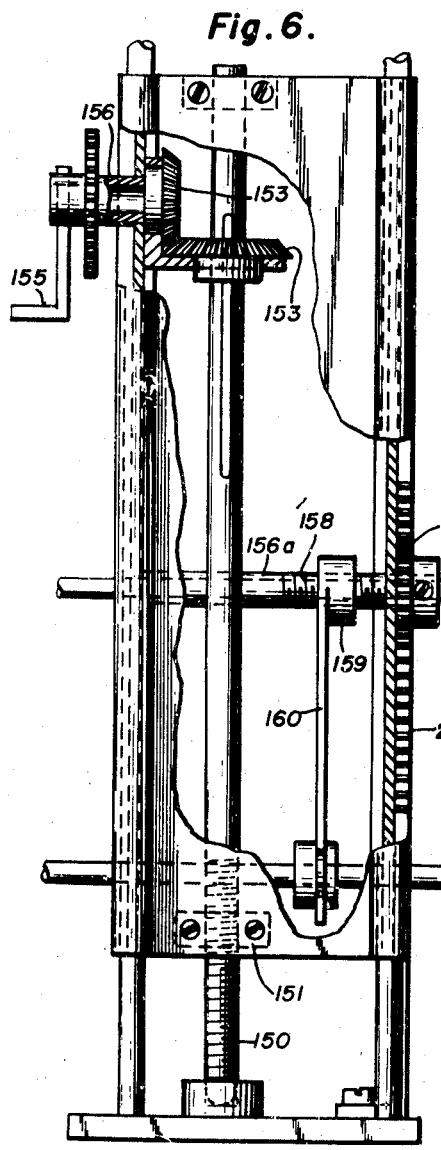
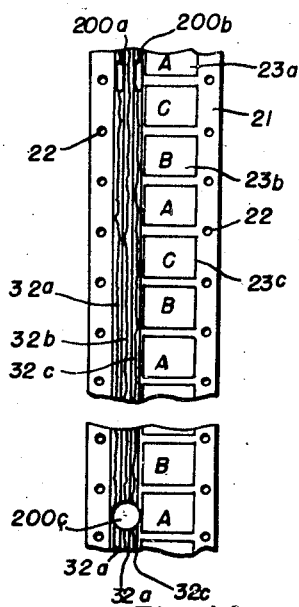
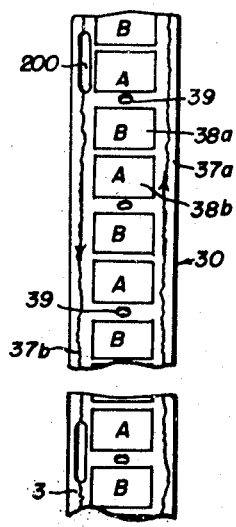
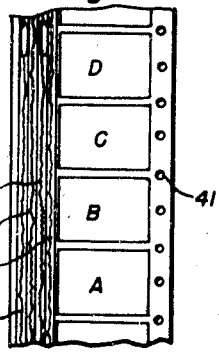
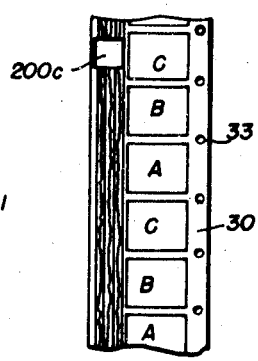
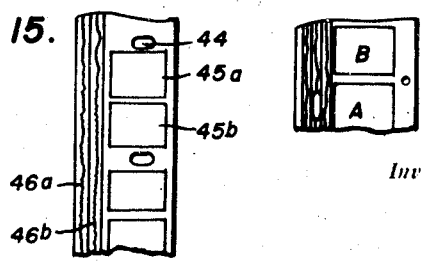
Inventor
Farid Naoum El-Mazzaoui
By Clarence A. O'Brien
and Harvey B. Jacobson
Attorneys Patented Sept. 27, 1949

2,483,040

UNITED STATES PATENT OFFICE 2,483,040

MOTION-PICTURE FILM WITH A PLURALITY OF PICTURE SERIES AND PROJECTOR FOR THE SAME

Farid Naoum El-Mazzaoui, Cairo, Egypt

Application February 18, 1947, Serial No. 729,324

10 Claims. (Cl. 88—16.2)

This invention relates to improvements in motion picture films and projectors for such films and, although applicable to silent motion picture films and cinematographic projectors of the optical type, it more particularly relates to motion picture films provided with sound tracks and to projectors of the type reproducing the motion pictures and translating the sound track into sounds by the customary photoelectric and electro-acoustic devices.

The principal object of the invention consists in providing motion picture films carrying a plurality of picture series and sound tracks relating to different subjects from which those pictures and sound tracks belonging to one subject may be arbitrarily selected in accordance with the requirements.

A further object of the invention consists in providing films with a plurality of picture series and sound tracks, which are of the customary width and in which the pictures of all the series are covering one section of the film while each of the sound tracks is running along the entire picture series.

A further object of the invention consists in providing a film with a plurality of picture series and sound tracks in which the selection of a specific series is performed by a hand operated adjustment of the film within a film gate.

A further object of the invention consists in providing a film with a plurality of picture series and sound tracks in which the selection of the sound track corresponding to a selected picture series is performed by a hand operated adjustment of the film within the sound gate.

A further object of the invention consists in providing a projector with means for adjusting a film within the film gate and within the sound gate simultaneously, thus permitting a selection of a picture series and sound track on a film arranged according to the invention.

A further object of the invention consists in arranging different picture series on a film in opposite directions along the same section of the film with the corresponding sound tracks arranged along the entire series of pictures in an adjacent section running alongside, but in different directions.

A further object of the invention consists in a camera permitting motion of the film for projection purposes in both directions.

A further object of the invention consists in a camera permitting motion of the film for projection purposes in both directions provided with automatic means for changing the direction in which the film is running when the film has reached the end of one picture series.

Further objects and the means, devices and apparatus for realizing the objects of the invention will be apparent when a more detailed description of said apparatus, devices, films and means has been given. Such a detailed description is contained in the following specification describing several embodiments and modifications of the invention. It is however to be understood in this case, that it is unnecessary to describe the numerous embodiments and modifications which will occur to the expert skilled in the art when the principles which have to be followed have been explained. Most projector systems now existing will be adaptable for the purposes of the invention with a different set of accessories and with various rather obvious modifications. The means hereinafter described were selected from the viewpoint of illustrating clearly the principles on which the invention is based and without regard to specific projector systems. A departure from the apparatus methods, devices, or films illustrated, not involving a change of principle is therefore not necessarily a departure from the invention.

The invention is illustrated in the accompanying drawing in which:

Figure 2 is a plan view of the projector.

Figure 3 is an elevational end view of the projector illustrated in Figure 1 when viewed from the right.

Figures 4 and 5 are elevational views of the projector illustrating a modification.

Figure 6 is a further partial elevational end view of a modification of the projector.

Figure 7 is a fragmentary plan view of the same modification.

Figures 8 and 9 illustrate an elevational side view and plan view respectively of a detail.

Figure 10 is an elevational front view of another detail.

Figures 11–15 are views of various types of film strips with picture shots and sound tracks arranged according to the invention.

Figure 16 illustrates sprocket wheels for different types of film.

Figure 17 is a diagram of connections for a completely automatic change.

Figure 1:
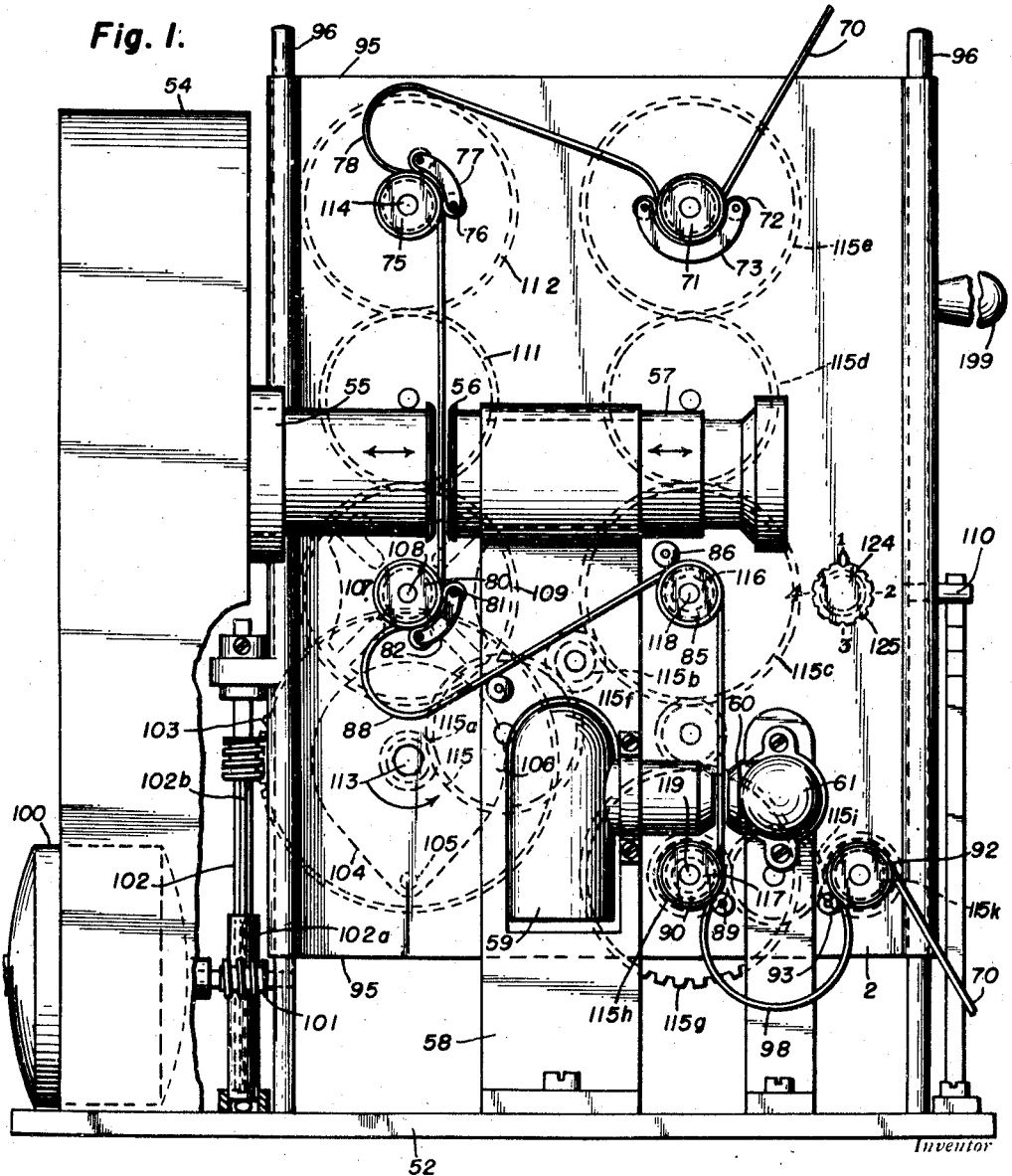
Figure 1 is an elevational view, partly in section, of a projector for motion pictures provided with a customary electro-optical acoustic translating device.

When a plurality of picture series showing different subjects is to be projected the usual procedure is to use separate film strips. In special cases however the picture series are aligned on the same strip and may be projected consecutively. The selection of an individual picture series in this case presents difficulties. Picture series for commercial and educational purposes which have to be repeated for an indefinite number of times sometimes use an endless film strip. The sound picture is, as a rule, provided by a synchronized gramophone record. No selection of a definite picture series is possible with these arrangements. Coin controlled apparatus use film strips of abnormal width divided transversely into sections. Each section contains a picture strip. The sound reproduction is furnished by synchronized gramophone records. Selection of a picture series is obtained by a transverse shifting of the film strip.

With the exception of the continuous film strips, all film strips have to be reeled back after projection.

This invention relates to sound films as distinguished from motion picture films synchronized with disk records, which carry sound tracks translatable into sound pictures by the well known means. The invention is based on films having the conventional or normal width for the type in question such as 35 mm. for the professional film, 17.5 mm. for the semi-professional film, 16 mm. for the so-called amateur film, 8 mm. for the home projector film, etc. These films according to the invention carry a plurality of picture series, corresponding to different subjects, by arranging the pictures of one series at distances which are a multiple of those usually used, while a second, third or further series of pictures is arranged between those of the first series. The sound tracks are however arranged side by side, in transverse divisions or sections and are therefore running continuously along the picture series in the customary manner.

According to the invention, therefore, adjacent single pictures or shots form part of different picture series, a picture series being formed by every second, third, fourth, etc., single picture on the film, according to the number of picture series.

All picture series may run through the projector in the same direction, each accompanied by its sound track and each film subject may simply be selected by putting its first picture into the correct position. An additional advantage is however gained if the picture series are running forward and backward on the film alternatively. In this case the film may run in one direction for one series and may run backward for the other picture series. Reeling the film backwards for putting it again into condition for projection is thus eliminated or reduced to infrequent cases.

Figures 11-15 illustrate films according to the invention showing a plurality of picture series or sequences. Various types of films have been selected for illustration. Figure 11 illustrates a film 21 which may be a 35 mm. film or a 16 mm. film of the type used for silent films with sprocket holes 22 on both sides. In this case a film with three picture series or sequences A, B, C is shown with the pictures 23a, 23b, 23c belonging to these series occupying around 60% or more of the available space between the sprocket feed holes 22 on both sides while the remainder of this space is occupied by the three sound tracks 32a, 32b, 32c. The three picture sequences or series marked A, B, C consist each of pictures arranged at a distance which is three times the distance between pictures of the conventional arrangement. The film strip has therefore to run at a speed which is three times the conventional speed to produce a motion picture with an equal number of frames per second.

As the conventional number of frames per second (24 for a professional film) is not always necessary, the film strip may run at a speed slower than the one required in accordance with the above stated principle, or even at the usual speed if the number of frames per second can be reduced. Such a reduction of the speed occurs normally with certain types of films such as 16 mm. and 8 mm. films which are customarily run at a speed of sixteen or even twelve frames per second, or such as cartoons running customarily at the speed of eight frames per second.

The number of picture series arranged in sequences spaced according to this invention can therefore as a rule be increased, if pictures can be projected with a reduced number of frames per second.

In Figure 12 a film strip 30 of the 16 mm. sound film type is shown with perforations 33 on one side only. In this case again three picture series A, B, C are arranged on the film strip.

Figure 13 shows a film strip 30 with central perforations 39 and with two picture series A, B with sound tracks 37a, 37b arranged symmetrically with respect to the pictures 38a, 38b.

Figure 14 shows a 16 mm. sound film with four series of pictures A, B, C, D, the perforations 41 being on one side of the pictures 40 while the sound tracks, 42a, b, c, d, are on the other side.

Figure 15 illustrates a film with perforations 44 on one side and with the pictures 45a, b arranged between the perforations. Only two series of pictures are shown. The sound tracks 46a, b, are adjacent the pictures. Manifestly this type of film may be of small width say 8 mm.

It will be clear from the figures that the perforations or slots may be placed at distances which are the double or multiple of the distances now used, if pictures are to be placed between them. In many cases however as seen from the figures, the perforations are arranged on a separate strip and their spacing does not interfere with the arrangement of the pictures.

The examples illustrated are intended to make it clear how the pictures and sound tracks are arranged either symmetrically or side by side in various cases which may arise when the invention is applied. As the number of possible arrangements is large only a few representative cases have been illustrated.

Before describing the apparatus by means of which film strips carrying a plurality of picture series arranged according to the invention are projected, attention may be drawn to the operations to be performed in order to change the series to be projected.

As the distance between consecutive pictures of each series A, B, C, is the same, the selection of the series depends on the centering of the first picture of the series to be projected at the film gate. To change the series the film has merely to be moved longitudinally for the longitudinal width of one, two or more pictures 23a, as the case may be, to bring the first picture of the series in position before the film gate. Simultaneously the sound gate and the film strip have to be moved relatively to each other, in order to bring the sound track corresponding to the selected picture before the sound gate. Theoretically therefore a perfect reproduction is obtained by shifting the film strip longitudinally and by shifting the sound gate transversely, and this can indeed be done without great difficulty. Practically however it is preferable to shift merely the film and to make all other appliances stationary. The transverse shifting movement is very small and as a rule does not exceed 1/20 or 1/25 inch. It therefore does not bring the picture out of focus and any unwanted irregularity which may occur, may be easily corrected by adjusting the film gate. As such a preliminary adjustment is the rule practically with every new film, it is part of the regular operation of the operator and does not put an extra burden on him. However a displacement of the sound gate if the remainder of the apparatus is at rest would entail re-adjustment of the focus of the exciter even with a small shifting movement of the gate and a displacement of the exciter carrying lamp and photocell is inadvisable on account of the shock sensitivity of the cell and exciter and an automatic shifting would be impracticable for these reasons.

The projector shown in the drawings and merely illustrating one example adapted to perform the above described movements is best illustrated in Figures 1 and 2. The projector is shown as mounted on a base 52, with the customary casing removed. The customary reel brackets carrying the supply and take up reels are not shown, as these and other parts of the projector are constructed and positioned in the customary way. The ventilated lamp housing 54 carries the tube 55 housing the condenser and the light control shutters (not shown). In front of this tube the film gate 56 is arranged, which is adjustable in the well known manner and is mounted on the tubular projector lens housing 57 carried by the bracket 58, secured on the base 52. The lens housing 57 carries the lens system (not shown). These and other parts of the projector are designed and constructed in the conventional manner and no details need be shown or illustrated as they are well known in the art.

Below the lens housing, the exciter lamp housing 59 is shown with a sound gate 60 behind which the photo cell 61 is arranged. The arrangement may be one with direct or indirect illumination of the photocell. The photocell and exciter lamp is fixedly supported on the base 52.

As seen from Figure 1, the film 70 coming from the supply reel (not shown) passes a feed sprocket 71 surrounded by two or more rollers 72 mounted on a semi-circular bracket 73 and holding the film 70 against the sprocket 71. The film then runs over a further sprocket wheel 75 cooperating with a pair of rollers 76 mounted on an arcuate arm 77. Between these two sprocket wheels a loop 78 is formed in the customary manner to permit an intermittent advance of the film through the film gate. The film then passes the film gate 50 and is taken up by a guide sprocket 80 cooperating with two rollers 81 mounted on an arcuate bracket 82. The film is then running over the sound gate feed sprocket 85 cooperating with a roller 86 and passes the sound gate 60. Between the feed sprocket 85 and the guide sprocket 80 a further loop 88 is formed. Below the sound gate 60 the film runs over a second guide sprocket 90, cooperating with a roller 89, to the take up sprocket wheel 92 cooperating with roller 93; from this wheel the film is running to the take up reel (not shown). Between the sprocket wheels 90 and 92 a further loop 98 may be formed.

While the general arrangement of the sprocket and rollers relative to the film gate and sound gate corresponds to the customary arrangement, the novel feature consists in the fact that the entire sprocket and guide roller system is mounted on a shiftable frame 95 which is slidable on a number of uprights 96, four being shown in the drawings. This frame preferably carries not only the sprocket wheels but also their shafts and driving gear wheels.

The driving power is supplied by a motor 100, mounted either on the frame itself or on the base plate 52. In the latter case the power is transmitted through a worm gear 101 by means of a divided shaft 102 with telescoping members 102a, 102b coupled with each other against rotation. Shaft member 102b drives a worm and worm gear wheel 103 mounted on shaft 113 coupled with disk 104 carrying the driving pin 105 and cam 106 of the Maltese cross drive wheel 107. The latter drives shaft 108 of sprocket wheel 80 and by means of intermediate gear wheels 109, 111, 112 drives shaft 114 of sprocket wheel 75.

The other sprocket wheels which are driven continuously, derive their motion from shaft 113 by means of intermediate gear wheels 115, 115a, b, c, d, e, f, g, h, i, j, k.

The continuously driven sprocket wheels 85 and 90 receive the film 70 from and deliver it to the adjacent sprocket wheels by means of loops 88, 98. It will therefore be clear that the correct and smooth running of the film will not be interfered with if these sprocket wheels are slightly shifted in either direction. These sprockets are therefore mounted on sleeves 116, 117 which are slidable on the shafts 118, 119. The sleeves are provided with grooved collars 120, 121 moved in a manner to be described. The sleeves 116, 117 are however coupled with their shafts 118, 119 as regards rotation.

The frame 95 is supported on a pin 110 which is transversely movable on said frame. For this purpose the pin is fixedly connected with a threaded collar 122 carried by a screw spindle 123 with coarse and steeply inclined screw threads engaging the internal threads of the collar. The spindle 123 projects outwardly and rearwardly towards the operator and carries on the portion 124 projecting from the frame a milled knob or head 125; it also carries a large gear wheel 126 driving by means of a pair of gears 129, another wheel 128 loose on the said shaft. The latter carries the pointer 130. Preferably the pointer moves much slower than the knob and performs for instance an angular movement of 90° when the knob is turned through 360°.

With every revolution of the knob 125 the collar 122 advances transversely and shifts pin 110. Pin 110 is supported on a stepped support 140, or within a stepped slot of a supporting plate and when advanced toward the left in Figure 3 the frame will drop to the next step 141, 142, 143.

The downward movement of the frame for one step will move the film strip within the film gate and will advance it for the distance of a single picture. This advance as seen in Figures 11–15 will bring a picture of the next picture series, say series B before the film gate 50, if originally the pictures of series A were in operative position. A further movement of the knob brings the picture of the series C in operative position and so forth.

It will be seen that the distance through which the film strip has to be advanced to bring the next picture series into operative position varies with the type of film to be used in the projector. If the projector is built for the use with several types of film, the support 140 is best fixed to the base with adjustable screws 145 with milled heads, so that different supporting standards may be used. The vertical length of the steps 141, 142, 143, in different supports varies and the proper support has to be selected when the projector is to be used for a different type of film.

Only one pin 110 has been shown, but in actual practice the mechanism shown will be duplicated. The second pin is however not driven separately but is coupled with the mechanism on the other side by means of a sprocket chain or the like.

In order to provide a more continuous shifting movement the mechanism shown in Figure 6 may be used. A vertical screw spindle 150 may be arranged at each side of the frame, which engages a screw threaded support 151 fixed on the frame. The spindle 150 is driven by means of gear wheels and bevel gears 153 from the shaft 156. This shaft carries a crank 155 or a knob and drives a pointer in the manner described. A rotation of the crank for one or two rotations entails a downward or upward movement of the frame with a corresponding change of the picture series.

In order to produce the required transverse movement of the sprocket wheels 85 and 90 in front of the sound gate which corresponds to the longitudinal shifting of the film in front of the film or aperture gate, the spindle 123 (Figure 3) or shaft 156a (Figure 6) is provided with a threaded section 158 with much finer threads. Along this section the internally threaded hub 159 of a shifter fork 160, which engages the finely threaded section 158 moves, whenever the spindle 123 or shaft 156a is rotated.

The fork is moreover provided with a depending arm 161 having two projecting shifter heads 162. Each head is provided with a fork, a semi-circular or circular cut or the like which enters into the grooves of the collars 120, 121 on sleeves 116, 117. A transverse movement of the fork therefore produces a corresponding transverse movement of the said collars and of the sprocket wheels 85 and 90 associated therewith. The extent to which the said sprocket wheels are moved depends on the fineness of the threads of the spindle section 158 and on the angular movement imparted to the shaft 156a or spindle 123 by the operator. The rotation of shaft 156a (Figure 6) is obtained either by means of a sprocket chain from shaft 156 or by means of rack 256 attached to the frame, engaging a toothed wheel 257 on the shaft 156a.

In projectors which are designed to handle different types of film the sprocket wheels have to be interchangeable. Figure 16 shows sprocket wheels of different widths which correspond to the varying widths of the film strips.

Figure 16a illustrates a sprocket wheel as used for the film shown in Figure 12. Figure 16b illustrates sprocket wheels as used in Figure 14 while Figure 16c shows sprocket wheels as used for films shown in Figure 15. Finally Figure 16d shows a sprocket wheel with central sprocket teeth as used in connection with film strips illustrated in Figure 13. For films as illustrated in Figure 11 the usual type of sprocket wheels with two rows of teeth is used which need not be illustrated.

The sprocket wheels may be provided with key ledges 165 fitting into grooves provided in drums mounted on the sprocket shafts or sleeves. They are held in an axial direction by removable flanges or disks 166 which are screwed on threaded end portions of the shafts, sleeves or drums.

A further modification of the projector is shown in Figures 4 and 5. In this modification the single movable frame sliding along vertical uprights is replaced by movable shields or pairs of shields 170, 171 which carry shafts 108a, 114a on which the sprockets 75, 80 are mounted. As shown in Figure 4 the driving gears are so arranged that the driving gear shafts for said shafts 108a, 114a are located at equal distance from the same. In the example shown these driving shafts 113a, 177 are located and arranged approximately within a horizontal line at the same distance. The shaft 108a which carries the Maltese cross 107 is driven by the pin 105 mounted on disk 104 which is carried by shaft 113a. This shaft also carries the gear wheel 103a which is loosely mounted on said shaft and is driven by a gear wheel 174 fixedly mounted on shaft 108a. The gear wheel 103a on shaft 113a is therefore driven by the Maltese cross. It meshes with gear wheel 175 driving another gear wheel 176 on shaft 177. The latter drives directly, or through further gears, gear wheel 112 on shaft 114a. The ratio of these gear wheels is so chosen that the two sprocket wheels 80 and 75 move with equal angular speed.

The shafts 177 and 113a are those shafts which are arranged at an equal distance from shafts 108a and 114a respectively. These shafts are supported rotatably on the base plate 52. The two pairs of shields 170, 171 as seen in Figure 4 extend beyond these shafts and are provided with bores for taking up and holding the said shafts. Each of the two shafts 177 and 113a forms a fulcrum around which the shields 170, 171 are turning, while the shafts 114a and 108 are carried by the two pairs of shields.

The two pairs of shields 170, 171 are connected by means of a connecting rod 179 swinging around pivots 181, 182. A second connecting rod 180 capable of pivoting around a pivot 181 is associated with the shields 170. This connecting rod is moved by means of an eccentric 185 mounted on a shaft 186. The said shaft is mounted on the base plate and is operated by a knob in the manner already described in connection with knob 125. This knob is turned by the operator and when the shaft 186 is rotated the rod 180 will move up and down. The shield 170 swings around shaft 113a and the shaft 108 with sprocket wheel 75 is thereby moved up and down.

As the gear wheels 174 move around the center 113a the engagement between said wheels and wheels 103a is not affected by such movement. The movement of shields 170 is transmitted to shields 171 which perform the same movement around shaft 177 acting as a fulcrum, with gear wheels 176 and 112 remaining in permanent engagement when rod 180 is moved. The upward and downward movement of the shafts 108a and 114a with sprockets 75 and 80 produce the required movement of the film within the film gate 56.

Shaft 186 may be provided with a second eccentric 187 which shifts the sprocket wheels 85 and 90 holding the film on both sides of the sound gate 60. The eccentric cam 187 drives a connecting rod 188 which is pivotally connected with a coupling member 189. The said coupling member is provided with bifurcated ends or with semi-circular or circular ends similar to those of fork 160 (Figure 8) which bifurcation or semi-circular cuts engage grooves 191 arranged in collar-like projections 192 of the sprocket wheels 90 and 85. These sprocket wheels in this case, instead of being mounted on sleeves are slidably mounted on shafts 118, 119, which have suitable end portions 193, 194 provided with a projecting key 195 which enter into a groove provided in the central bore of the sprocket wheels. These end portions may also be square or hexagonal and cooperate with corresponding bores in the sprocket wheels.

Preferably guides 197 are arranged securing a steady straight movement of the coupling member 188. The film gate may be provided with rollers 266.

The foregoing mechanisms are merely to be regarded as examples. The mechanism for moving the film in the film and sound gate may comprise other well known stepping or shifting mechanism such as a rack operated by a toothed wheel, a stepping mechanism actuated by an electromagnet or the like.

In the foregoing description it was assumed that the shifting of the film in order to change the picture series is performed by the operator. The operator when all picture series run in the same direction proceeds as usual, merely selecting the series. When every second picture series runs backward, the reeling back of the film may be dispensed with and the operator in this case has to select the direction in which the motor should run in addition of selecting the picture. The return of the frame is effected by hand using the handle 199 for this purpose.

The reversal of the motor at the end of the film may be obtained automatically in some well known manner, for instance by providing a notch in the film which permits entrance of a lever operating the reversal switch. However it is preferable to operate such a switch electrically in the manner shown in Figure 17.

The diagram shows such an automatic reversal of the motor which is accompanied in this case by an automatic change of the picture series, which in its turn is produced by shifting the film section within the film gate for one picture frame so as to bring the first picture of the backward running series into the correct position within the film gate. Simultaneously as described the section of the film which runs through the sound gate is shifted transversely. Both movements in all the modifications described originate in the turning of a shaft 123, 156. They may therefore be performed automatically by providing automatic means for turning the said shaft.

Such a means for reversing the direction of rotation of the motor and for turning the shaft 123, 156, to the desired extent is illustrated diagrammatically.

The film is provided with a slot 200 preferably arranged in the space or strip reserved for the sound track at the end of the picture series. Where more than two picture series are used one slot is arranged for each series, as shown at 200a, 200b in Figure 11 or for all series (200c).

Contact rollers 201, 202 resiliently held on both sides of the film 70 are normally separated by the film strip. However when the slot 200 is located between the rollers 201, 202, the rollers touch each other and electric contact is established between them. One of the rollers 201 may be grounded (at 204) or connected with one lead connected with a battery, the other is in contact with a spring 205 pressed against its hub and by means of lead 206 controls a relay 210 connected with a source of current supply which, in the example shown, is a source of D. C. current. The terminal 209 is conected with the said source of current supply. This terminal is also connected by means of conductor 211 to the electromagnetic reversing switch 212 and to field conductor 213, the other field conductor being connected with the other terminal 219.

The electromagnet 220 of the reversing switch is connected with the same terminal. Its circuit includes a contact 221 operated by relay 210 and the coil of a solenoid 230, the core 229 of which operates a rack 228. This rack meshes with a toothed wheel 227 which is mounted on spindle 123 or on shaft 156 according to the modification with which this electromagnetic system is connected. The reversing switch permits to reverse the direction of the current supplied to the armature of the motor.

It will be understood that when the film has reached the end of a series, the slot 200 will have come under the rollers 201, 202, the relay 210 will operate as its circuit 209, 210, 206, 205, 202, 201, 204 is closed and this will close the circuit 219, 220, 221, 222, 230, 232 which includes the electromagnet 220 and the solenoid 230. The former operates the reversing switch 212 and reverses the direction in which the motor is running thus reeling the film in a direction opposite to that of the preceding picture series. Simultaneously the shaft 123 or 156 is turned for the desired amount. This advances the film in the film gate for one picture and shifts the film in the sound track transversely to bring the next sound track into line with the photocell opening. The film therefore automatically runs backward with the second picture series in focus. When the two contact rollers are again separated by the film material the circuit through relay 210 is broken and the electromagnet 220 and the solenoid are de-energized. The switch 212 remains in its position until the electromagnet is again energized. The rack 228 may be returned by a spring and may be disengaged while returning in the well known manner.

For producing or printing films according to the invention a camera or a copying apparatus with a construction very similar to the projector described may be used.

It will be clear that a film and a projector of the type described has many applications which cannot be realized by other types of films or cameras. It will be most useful for producing films for small theatres or for amateur productions containing the entire program for one or two hours and it will materially reduce the manipulation which is necessary. The free selection of the picture series and the fact that the film may be operated without back reeling permits to use films of this type in cases in which several special films were used hitherto or in which no sound film at all could be used. For instance the film according to the invention may be used instead of an endless film, which requires much space for commercial, educational and scientific demonstration purposes.

Likewise the film is well adapted for the use in coin apparatus where free selection constitutes a particularly difficult problem.

Moreover one-half of a customary film may form a forwardly running and one-half a backwardly running series, so that the film is permanently in condition for projection without any back reeling operation. Further applications in special cases will be obvious to persons skilled in this art.

It is finally to be understood that the mechanisms as shown are mere illustrative examples subject to changes to suit particular conditions and as long as they perform the required movements as explained the nature of the mechanism does not play a vital part when putting the invention into effect.

I claim:

1. A projector for motion picture films with a plurality of picture series, arranged in a single longitudinal strip, each series consisting of spaced pictures alternating with pictures of other series, and with a plurality of transversely spaced longitudinally arranged sound tracks, comprising a stationary light beam projecting means, a stationary film gate located in the path of the light beam, stationary sound reproducing means including an exciter lamp, a photoelectric cell and a stationary sound gate between them, a sprocket wheel on each side of each gate, said sprocket wheels holding and advancing the film sections passing through said gates within said gates, means for driving said sprocket wheels, means for moving the sprocket wheels on both sides of the film gate in unison in a direction coinciding substantially with the longitudinal movement of the film advance, through the film gate and for a distance corresponding to the distance between pictures of different series and means for moving the sprocket wheels on both sides of the sound gate in a direction substantially transverse to the direction of movement of the film through the sound gate for a distance corresponding to the distance between sound tracks.

2. A projector for motion picture films with a plurality of picture series, arranged in a single longitudinal strip, each series consisting of spaced pictures alternating with pictures of other series, and with a plurality of transversely spaced longitudinally arranged sound tracks comprising stationary light beam projecting means, a stationary film gate arranged in the path of the beam, a rotatable sprocket wheel on each side of the film gate for holding the film section passing through the same, further sprocket wheels, means for driving said sprocket wheels, a slidable frame carrying said sprocket wheels, and means for moving said frame relatively to the stationary film gate in a direction substantially coinciding with the direction of movement of the film through the film gate.

3. A projector for motion picture films with a plurality of picture series, arranged in a single longitudinal strip, each series consisting of spaced pictures alternating with pictures of other series, and with a plurality of transversely spaced longitudinally arranged sound tracks, comprising a stationary light beam projecting means, a stationary film gate located in the path of the light beam, stationary sound reproducing means, including an exciter lamp, a photoelectric cell and a stationary sound gate between them, a sprocket wheel on each side of the film gate, said sprocket wheels holding and advancing the film sections passing through said gate, further sprocket wheels arranged on both sides of the sound gate, means for driving said sprocket wheels, a slidable frame carrying said sprocket wheels, means for moving said frame relatively to the stationary members in a direction substantially coinciding with the direction of movement of the film through the film gate for a distance corresponding to the distance of pictures of different series and means on said frame for producing a movement of the sprocket wheels arranged on both sides of the sound gate transversely to the movement of the frame for a distance corresponding to the distance between sound tracks of different series.

4. A projector for motion picture films with a plurality of picture series, arranged in a single longitudinal strip, each series consisting of spaced pictures alternating with pictures of other series, and with a plurality of transversely spaced longitudinally arranged sound tracks, comprising a light beam projecting means, a stationary film gate located in the path of the light beam, sound reproducing means including an exciter lamp, a photoelectric cell and a stationary sound gate between them, a sprocket wheel on each side of each gate, said sprocket wheels holding and advancing the film sections passing through said gates within said gates, further sprocket wheels, means for driving said sprocket wheels, means for carrying said sprocket wheels, means for moving said carrying means relatively to the stationary film gate in a direction substantially coinciding with the direction of movement of the film through the film and means for producing a step by step movement moving the carrying means in each step through a distance corresponding to the longitudinal extension of a single picture on the film.

5. A projector for motion picture films with a plurality of picture series, arranged in a single longitudinal strip, each series consisting of spaced pictures alternating with pictures of other series, and with a plurality of transversely spaced longitudinally arranged sound tracks, comprising a stationary light beam projecting means, a stationary film gate located in the path of the light beam, stationary sound reproducing means, including an exciter lamp, a photoelectric cell and a stationary sound gate between them, a sprocket wheel on each side of the film gate, a movable carrying unit for said sprocket wheels, means for moving said carrying unit relatively to the stationary film gate in a direction substantially coincident with the direction of film advance for a distance corresponding to the distance between pictures of different series, said means for moving the carrying unit including a rotatable shaft and means for transmitting the movement from said shaft to said sprocket wheel carrier unit, further transversely movable sprocket wheels on both sides of the sound gate on said carrier unit, and means on said rotatable shaft for producing a transverse movement, at right angles to the longitudinal movement of the film, of the said transversely movable sprocket wheels concurrently with the movement of the sprocket wheel carrier in a longitudinal direction.

6. A projector for motion picture films with a plurality of picture series arranged in a single longitudinal strip, each series consisting of spaced pictures alternating with pictures of other series and with a plurality of transversely spaced longitudinally arranged sound tracks, comprising stationary beam projecting means, a stationary film gate in the path of the beam, a sprocket wheel on each side of said film gate for holding a film section passing through said beam at right angles thereto and for moving said film section longitudinally through the gate to bring pictures of the same size successively into position for projecting the same, driving means for said sprocket wheels, a shiftable carrying unit for the sprocket wheels on both sides of the film gate and means for producing a relative longitudinal displacement of the film section passing through the film gate for a distance corresponding to the distance between the pictures of different series on the picture strip.

7. A projector for motion picture films with a plurality of picture series arranged in a single longitudinal strip, each series consisting of spaced pictures alternating with pictures of other series, and with a plurality of transversely spaced longitudinally arranged sound tracks, comprising stationary light beam projecting means, a stationary film gate in the path of the light beam, sound producing means, including an exciter lamp, a photoelectric cell and a sound gate between them, sprocket wheels for holding film sections passing through said gates and for moving said film longitudinally through the same, a movable carrying unit for carrying said sprocket wheels, means for shifting said carrying unit in the direction of the film advance for a distance smaller than the distance between pictures of the same series, so as to displace the film section passing through the film gate longitudinally relatively to said film gate for the above mentioned distance, and means for shifting the sprocket wheels holding the film section passing through the sound gate in a transverse direction for producing a transverse displacement between the sound gate and the film section passing through it.

8. A projector for motion picture films with a plurality of picture series arranged in a single longitudinal strip, each series consisting of spaced pictures alternating with pictures of other series, and with a plurality of transversely spaced longitudinally arranged sound tracks, comprising stationary light beam projecting means, a stationary film gate arranged in the path of the light beam, a rotatable sprocket wheel on each side of the light beam and film gate, for holding the film section passing through the same, means for driving said sprocket wheels and selective shifting means operative before the operation of the driving means, for moving the sprocket wheels on each side of the film gate in unison with respect to said film gate in a direction substantially coinciding with the direction of advance of the film for a distance corresponding to a fraction of the distance between two consecutive pictures of the same series, a stationary exciter lamp and photoelectric cell, a stationary sound gate between them, and further selective means positively coupled with the aforesaid selective shifting means, for shifting the film in the sound gate for a distance corresponding to the distance of the sound tracks in a transverse direction.

9. A projector for motion picture films with a plurality of picture series arranged in a single longitudinal strip, each series consisting of spaced pictures alternating with pictures of other series, and with a plurality of transversely spaced longitudinally arranged sound tracks, comprising a stationary light beam projecting means and a stationary picture projection film gate, having an opening corresponding to the series of one picture, a sprocket wheel for holding the film section passing through the gate on each side thereof, driving means for said sprocket wheels, a movable carrier for said sprocket wheels, means for displacing said carrier in the direction of the film advance for a distance corresponding to the distance of pictures of different series, a stationary sound gate, an exciter lamp and a photoelectric cell, a sprocket wheel on each side of the sound gate, for drawing the film through the same, and means for displacing the last named sprocket wheels transversely for a distance corresponding to the distance between sound tracks of different series.

10. A projector for motion picture films with a plurality of picture series arranged in a single longitudinal strip, and with a plurality of transversely spaced longitudinally arranged sound tracks, each film being provided near the end of each picture series with a steering slot, comprising a stationary light beam projecting means, a film gate in the path of said light projecting means, sprocket wheels for holding a film section in the film gate and for moving the film longitudinally through the gate, means for driving said sprocket wheels including a reversible motor, a carrying unit for said sprocket wheels, means for shifting the sprocket wheels in the direction of the film advance relatively to said film gate for changing the picture series, a sound gate, sprocket wheels on both sides of said sound gate for advancing the film longitudinally through the same, means for shifting said sprocket wheels and film transversely positively coupled with the means for shifting the carrying unit, electromagnetic means for simultaneously reversing the driving motor and for shifting the sprocket wheels carrying unit near the film gate and operative circuits and operative closing means, therefore including contacts, closing through the steering slot arranged near the end of the picture series on the film.

FARID N. EL MAZZAOUI.

REFERENCES CITED

The following references are of record in the file of this patent:

UNITED STATES PATENTS

| Number | Name | Date |
| --- | --- | --- |
| 1,073,411 | Dressler et al. | Sept. 16, 1913 |
| 1,236,639 | Williams | Aug. 14, 1917 |
| 1,713,503 | Von Madaler | May 14, 1929 |
| 1,858,555 | Owens | May 17, 1932 |
| 2,077,860 | Day | Apr. 20, 1937 |
| 2,173,768 | Sabol et al. | Sept. 19, 1939 |
| 2,215,502 | Harper | Sept. 24, 1940 |
| 2,322,489 | Von Madaler | June 22, 1943 |

FOREIGN PATENTS

| Number | Country | Date |
| --- | --- | --- |
| 743,069 | France | Jan. 6, 1933 |
| 637,962 | Germany | Nov. 6, 1936 |
| 456,791 | Great Britain | Nov. 16, 1936 |